United States Patent Office 3,519,670
Patented July 7, 1970

3,519,670
BOROSILICONE MATERIALS
Mark Markovitz, Schenectady, N.Y., assignor to General Electric Company, a corporation of New York
No Drawing. Filed Dec. 20, 1966, Ser. No. 603,122
Int. Cl. C07f 5/02, 7/02
U.S. Cl. 260—448.2
4 Claims

ABSTRACT OF THE DISCLOSURE

New liquid reaction products of alkoxy functional organosilicone material and boric acid material are used to cure epoxy resins producing clear materials having low dissipation factor, good corona resistance and other desirable properties.

---

The present invention relates to new organosilicone materials and to the curing of epoxy resins with these materials. More particularly, the invention relates to liquid borosilicone reaction products of alkoxy functional organosilicone compounds and boric acids and their use in producing cured, solid, epoxy resin materials which are characterized by low dissipation factor, good corona resistance and other salutary properties.

The use of various boron compounds in the curing of epoxy resins is well known. For example, borate esters such as tricresyl borate, tributyl borate, and the like have been utilized to cure epoxy resins to produce useful materials. It has also been known as shown by U.S. Pat. 2,953,545 to cure epoxy resins using mixtures of boron-containing esters and organosilicone materials.

It has unexpectedly been found that epoxy resins having a community of desirable electrical and physical characteristics can be obtained by curing such resins with liquid borosiloxane materials derived from the reaction of alkoxy functional silicones and boric acid. Generally speaking, from about 10 to 60 percent by weight of borosilicone material can be used to provide varying characteristics desired for particular applications.

Those features of the invention which are believed to be novel are set forth with particularity, in the claims appended hereto. The invention will, however, be better understood from a consideration of the following description.

Generally speaking, any of a number of alkoxy functional silicones may be used as a reactant in preparing the curing agent as well as mixtures. Among such borosiloxane liquid polymers are those described in U.S. Pat. 2,517,945. Typically, according to this teaching, a polymer can be prepared from diphenylsilanediol and benzene boronic acid by heating the reactants in equal molar quantities for about 19 hours at temperatures ranging from about 250° C. to 260° C. to produce a soft material which begins to flow at about 80° C. and having recurring structural units of the general formula:

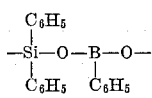

The above material can also be prepared by the cohydrolysis of phenyldichloroborane and diphenyldichlorosilane followed by heating for 16 hours at 230° C., this preparation being taught by Japanese Pat. 1441 (1952). Among the materials which are particularly useful in connection with the present invention is Sylkyd 50 which is a methoxylated polysiloxane having the average chemical structure of dimethyltriphenyltrimethoxytrisiloxane which can be represented by Formula I and diphenyldiethoxysilane known as XC-3709 and represented by Formula II.

I
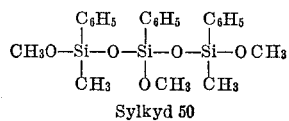
Sylkyd 50

II
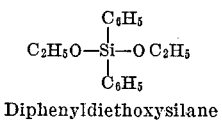
Diphenyldiethoxysilane

While in the examples below materials typified above are reacted with boric acid, it will be realized that any of a large number of boric acid derivatives can be used as well as mixtures including but not limited to phenylboric acid, butylboric acid, dodecylboric acid, nonylboric acid, cyclohexylboric acid, octadecylboric acid, m-phenylenediboric acid, and p-phenylenediboric acid and the like.

It will also be realized by those skilled in the art that a large number of alkoxy silicone materials and mixtures thereof can be used in place of those specifically mentioned above. These include but are not limited to XR-6188 (methylphenylpolysiloxane, 15 percent by weight methoxy, SR-196 (methylphenylpolysiloxane, 10 percent by weight methoxy), SR-191 (methylphenylpolysiloxane, 15 percent by weight methoxy), beta-cyanoethylmethyldiethoxysilane (Product No. XC-3712), phenylmethyldimethoxysilane, diphenylmethylmethoxysilane, etc.

The boron content of the borosiloxane can be controlled by varying the alkoxy content of the polysiloxane, by using mono-functional alkoxy silicones such as trialkyl alkoxysilanes, by varying the relative quantity of boric acid and by using boric acid derivatives in place of boric acid itself.

While the reaction products of alkoxysilanes or alkoxy polysiloxanes and boric acid, or boric acid derivatives, were used in this invention, similar reaction products can be produced by reacting hydroxy functional silanes (silanols) or hydroxy functional polysiloxanes and boric acid esters such as trimethyl borate or tributyl borate. An additional alternate procedure is to react hydride functional silanes or polysilozanes with boric acid or boric acid derivatives.

Particularly useful in connection with the present invention are the cycloaliphatic epoxy resins having 1,2 epoxy groups which are characterized by comparatively faster curing and harder cured materials. Among such materials are ERLA 4221 having an epoxide equivalent weight of from about 126 to 140, and having the following formula:

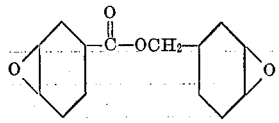

Another such material is UNOX Epoxide 206 manufactured by Union Carbide Plastics Company, having an epoxide equivalent weight of from 74 to 78 and represented by the following formula:

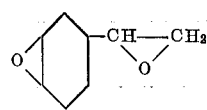

Another useful material is ERL 4201 having an epoxide equivalent weight of from about 145 to 156, represented by the following formula:

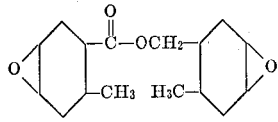

Also useful is CY 175 with an epoxide equivalent weight of 160 and represented by the following formula:

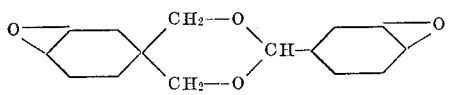

Also useful are other well known resins such as the Oxiron resins which are essentially epoxidized polyolefins. Epoxidized oils or epoxidized triglycerides are also useful, such materials being typified by Epoxol 9-5, epoxide equivalent weight 175 to 178. Still other typical useful materials are dicyclopentadiene dioxide and limonene dioxide.

Generally speaking, the borosiloxane materials of the present invention are prepared by reacting the alkoxy polysiloxane or alkoxy silane material with boric acid or boric acid derivatives in such amounts that 0.5 to 1.5 hydroxy equivalents of the boric acid or boric acid derivative per 1.0 alkoxy equivalent of the alkoxy silane or alkoxy polysiloxane are present in the reaction mixture initially.

For example, Sylkyd 50 in the amount of 470 g. (3.0 methoxy equivalents) was reacted with boric acid in the amount of 42 g. (2.0 hydroxy equivalents) by heating and stirring the reactants at a temperature of from about 96° C. to 200° C., 64 g. of distillate being collected in about two hours, and consisting of methanol and methyl borate. The reaction mixture was a transparent, nearly colorless liquid, the IR spectrum of which had a comparatively strong absorption band at $7.45\mu \pm 0.02$. This compares with the B—O absorption band for $(R_3SiO)_3B$ compounds which is $7.50 \pm 0.03\mu$.

A low viscosity borosiloxane was synthesized from diphenyldiethoxysilane in the amount of 272 g. (1.0 mole) and boric acid in the amount of 31 g. (0.5 mole). The boric acid reacted and dissolved as ethanol was distilled from the reaction mixture at from 110° C. to 193° C. to produce a water-white, low viscosity borosiloxane.

The borosiloxanes prepared from Sylkyd 50 and boric acid as described above was mixed with epoxy resin ERLA 4221 to form transparent solutions which gelled without exotherm even after 2 to 5 hours at room temperature. After one hour at 100° C. plus two hours at 120° C. plus 16 hours at 160° C., materials which were very light colored and clear and hard and glass-like were produced which even at 175° C. had very low dissipation factors. Shown in Table I below is the dissipation factor v. temperature for the various parts by weight of epoxy resin and borosiloxane used.

TABLE I

| | | | | |
|---|---|---|---|---|
| ERLA 4221 | 40 | 50 | 60 | 70 |
| Sylkyd 50–H₃BO₃ reaction product | 60 | 50 | 40 | 30 |
| Dissipation factor (10 v.p.m., 60 cycles) (° C.): | | | | |
| 25 | 0.001 | 0.001 | 0.001 | 0.001 |
| 50 | 0.001 | 0.001 | 0.001 | 0.002 |
| 75 | 0.001 | 0.001 | 0.004 | 0.008 |
| 100 | 0.001 | 0.001 | 0.009 | 0.010 |
| 125 | 0.001 | 0.001 | 0.009 | 0.012 |
| 155 | 0.001 | 0.001 | 0.007 | 0.013 |
| 175 | 0.001 | 0.001 | 0.006 | 0.015 |

Epoxy Resin UNOX 206 and the above Sylkyd 50-boric acid reaction product were mixed together in various proportions, the materials being allowed to gel at room temperature and then cured for one hour at 100° C. plus one hour at 120° C. plus 15 hours at 160° C. Shown in Table II below are the dissipation v. temperature relationships of various weight proportions of these particular materials.

TABLE II

| | | | | |
|---|---|---|---|---|
| UNOX 206 | 50 | 60 | 70 | 80 |
| Sylkyd 50–H₃BO₃ reaction product | 50 | 40 | 30 | 20 |
| Dissipation factor (10 v.p.m., 60 cycles) (°C.): | | | | |
| 25 | 0.005 | 0.002 | 0.002 | 0.002 |
| 75 | 0.017 | 0.016 | 0.015 | 0.012 |
| 100 | 0.014 | 0.014 | 0.014 | 0.014 |
| 125 | 0.009 | 0.012 | 0.013 | 0.013 |
| 150 | 0.007 | 0.037 | 0.010 | 0.011 |
| 175 | 0.008 | 0.008 | 0.008 | 0.010 |

Mixtures of various epoxy resins can also be cured with the present borosiloxane materials to provide useful materials. For example, mixtures of UNOX 206 and ERLA 4221 were mixed with various weight proportions of Sylkyd 50-boric acid reaction product and cured for 15 hours at 150° C. Shown in Table III below are the weight proportions of epoxy resins and borosiloxane curing agent used along with the dissipation factor of such materials at various temperatures. The dissipation factor, as well as the dielectric constant of the present materials, even after heat aging for extended periods at elevated temperatures remain at satisfactorily low values.

TABLE III

| | | |
|---|---|---|
| UNOX 206 | 30 | 35 |
| ERLA 4221 | 30 | 35 |
| Sylkyd 50–H₃BO₃ | 40 | 30 |
| Dissipation factor—(10 v.p.m., 60 cycles) (° C.): | | |
| 25 | 0.0016 | 0.0018 |
| 75 | 0.023 | 0.019 |
| 100 | 0.020 | 0.022 |
| 125 | 0.021 | 0.020 |
| 150 | 0.0055 | 0.013 |
| 175 | 0.0081 | 0.010 |

There is shown in Table IV below the effect on dissipation factor and dielectric constant of heat aging of various mixtures as shown, the curing conditions for the various epoxy resin-borosiloxane combinations being those shown heretofore for the particular example.

TABLE IV

| Days | 25° C. | 75° C. | 100° C. | 125° C. | 150° C. | 175° C. |
|---|---|---|---|---|---|---|
| ERLA 4221/Sylkyd 50–H₃BO₃ Reaction product, 50/50—dissipation factor (dielectric constant) | | | | | | |
| 30 at 135 C | 0.003 (3.55) | 0.004 (3.62) | 0.0038 (3.68) | 0.0036 (3.74) | 0.003 (3.74) | 0.008 (3.81) |
| 30 at 160 C | 0.003 (3.37) | 0.004 (3.48) | 0.004 (3.48) | 0.003 (3.53) | 0.002 (3.51) | 0.0000 (3.56) |
| 30 at 180 C | 0.003 (3.52) | 0.004 (3.63) | 0.004 (3.65) | 0.004 (3.68) | 0.003 (3.68) | 0.0001 (3.72) |
| UNOX 206/Sylkyd 50 H₃BO₃ reaction product, 70/30—Dissipation factor (dieletric constant) | | | | | | |
| 30 at 135 C | 0.003 (3.56) | 0.003 (3.63) | 0.004 (3.64) | 0.004 (3.68) | 0.003 (3.66) | 0.0001 (3.74) |
| 30 at 160 C | 0.003 (3.53) | 0.003 (3.60) | 0.004 (3.62) | 0.004 (3.68) | 0.003 (3.63) | 0.0001 (3.68) |
| 30 at 180 C | 0.003 (3.56) | 0.003 (3.62) | 0.035 (3.45) | 0.038 (3.46) | 0.015 (3.52) | 0.032 (3.34) |
| UNOX 206/Sylkyd 50 H₃BO₃ reaction product, 80/20—Dissipation factor (dielectric constant) | | | | | | |
| 30 at 135 C | 0.003 (3.82) | 0.003 (3.87) | 0.003 (3.89) | 0.004 (3.90) | 0.003 (3.90) | 0.0005 (3.98) |
| 30 at 160 C | 0.003 (3.79) | 0.003 (3.88) | 0.004 (3.86) | 0.004 (3.88) | 0.003 (3.88) | 0.0002 (3.94) |
| 30 at 180 C | 0.003 (3.89) | 0.003 (3.97) | 0.004 (3.98) | 0.004 (3.98) | 0.003 (3.98) | 0.0001 (4.02) |

Note.—All samples were aged 30 days in mechanical convection ovens.

Shown in Table V below are the dissipation factors at various temperatures of castings prepared from epoxy resin ERLA 4221 and the above described diphenyldiethoxysilane-boric acid reaction product, the materials being cured for two hours at 100° C. plus 15 hours at 160° C.

TABLE V

| | | |
|---|---|---|
| ERLA 4221 | 50 | 70 |
| Diphenyldiethoxysilane-$H_3BO_3$ | 50 | 30 |
| Dissipation factor—(10 v.p.m., 60 cycles) (° C.): | | |
| 30 | 0.006 | 0.003 |
| 100 | 0.014 | 0.016 |
| 125 | 0.014 | 0.015 |
| 150 | 0.011 | 0.015 |

Not only do the dissipation factor and dielectric constant of the present materials make them very useful but their tensile strength, tensile modulus and percent elongation as well are desirable.

Shown in Table VI below are the values of these parameters for various weight proportions of epoxy resin ERLA 4221 and the reaction product of Sylkyd-50 and boric acid which had been cured for 40 hours at 160° C.

TABLE VI

| ERLA 4221 | 50 | 60 | 70 | 80 |
|---|---|---|---|---|
| Sylkyd 50-$H_3BO_3$ | 50 | 40 | 30 | 20 |
| Tensile strength, p.s.i. | 5,270 | 6,950 | 5,322 | 5,664 |
| Tensile modulus, p.s.i. | $2.50 \times 10^5$ | $2.53 \times 10^5$ | $2.92 \times 10^5$ | $1.21 \times 10^5$ |
| Elongation at break, percent | 2.11 | 2.96 | 1.85 | 5.16 |

Of particular interest in connection with the present materials is their corona resistance which is far and way superior to that of the usual epoxy resins. Shown in Table VII below is the corona resistance of epoxy resin ERLA 4221 cured with various proportions of Sylkyd 50-boric acid reaction product. The corona resistance was measured by means of a needle point electrode in air at 105° C., 3,000 cycles and 2,500 volts. The air gap was 15 mils. The samples which were cured for 15 hours at 150° C. were 30 mils thick. It is particularly to be noted that the 50-50 by weight proportions of epoxy resin and borosiloxane curing agent produced materials which had not failed at 4000 hours. This compares favorably with silicone rubber itself which has a life of about 5,600 hours. Typical epoxy resins cured with carboxylic acid hardeners fail under a similar test in about 20 hours as do amine cured epoxy resins of the usual type.

TABLE VII

| | Hours | |
|---|---|---|
| Sample | Avg. failure time | Range |
| Epon 1001, N-amino-ethyl piperazine | 17 | 3-23 |
| Epon 1004, acid cured | 18 | 6-31 |
| ERLA 4221    Sylkyd-50 $H_3BO_3$ | | |
| 75 parts       25 parts | 288 | 257-340 |
| 70 parts       30 parts | 582 | 566-598 |
| 50 parts       50 parts | [1] 4,000 | |
| Silicone rubber | [2] 5,566 | |

[1] No failures.
[2] 1 failure out of 5.

There are prepared by the present invention epoxy resins cured with borosiloxane materials to clear, nearly colorless, glass-like solids which further do not form any volatile materials during cure. The cured materials are particularly characterized by low dissipation factors even at elevated temperatures over wide ranges of curing agent concentration as well as by salutary dielectric constant and other physical characteristics. They are useful in making clear structures, as potting materials, high voltage insulation, and as coating materials.

What I claim as new and desire to secure by Letters Patent of the United States is:

1. The liquid reaction product of boric acid and alkoxy functional organosilicone material selected from the group consisting of diphenyldiethoxysilane and dimethyltriphenyltrimethoxytrisiloxane, there being from about 0.5 to 1.5 hydroxy equivalents of boric acid for each alkoxy equivalent of said alkoxy functional organosilicone material.

2. A composition as in claim 1 wherein said organosilicone material is dimethyltriphenyltrimethoxytrisiloxane.

3. A composition as in claim 1 wherein said organosilicone material is diphenyldiethoxysilane.

4. A composition as in claim 1 wherein said organosilicone material is liquid methylphenylmethoxypolysiloxane.

References Cited

UNITED STATES PATENTS

| | | | |
|---|---|---|---|
| 2,517,945 | 8/1950 | Upson | 260—448.2 X |
| 2,644,805 | 7/1953 | Martin | 260—448.2 X |
| 2,915,543 | 12/1959 | Groszos. | |
| 2,957,900 | 10/1960 | Groszos. | |
| 3,161,613 | 12/1464 | Sprung | 260—448.2 X |

TOBIAS E. LEVOW, Primary Examiner

P. F. SHAVER, Assistant Examiner

U.S. Cl. X.R.

260—2, 448.8